(12) United States Patent
Postelnik

(10) Patent No.: US 12,518,300 B2
(45) Date of Patent: Jan. 6, 2026

(54) SERVING AN ONLINE ADVERTISEMENT ASYNCHRONOUSLY

(71) Applicant: CLOUDFLARE, INC., San Francisco, CA (US)

(72) Inventor: Igor Postelnik, Austin, TX (US)

(73) Assignee: CLOUDFLARE, INC., San Francisco, CA (US)

( * ) Notice: Subject to any disclaimer, the term of this patent is extended or adjusted under 35 U.S.C. 154(b) by 639 days.

(21) Appl. No.: 16/911,040

(22) Filed: Jun. 24, 2020

(65) Prior Publication Data

US 2020/0402115 A1 Dec. 24, 2020

Related U.S. Application Data

(60) Provisional application No. 62/865,763, filed on Jun. 24, 2019.

(51) Int. Cl.
  *G06Q 30/0241* (2023.01)
  *H04L 67/01* (2022.01)
  *H04L 67/146* (2022.01)
(52) U.S. Cl.
  CPC ..... *G06Q 30/0277* (2013.01); *G06Q 30/0276* (2013.01); *H04L 67/01* (2022.05); *H04L 67/146* (2013.01)
(58) Field of Classification Search
  None
  See application file for complete search history.

(56) References Cited

U.S. PATENT DOCUMENTS

2003/0005000 A1\* 1/2003 Landsman ......... G06Q 30/0262
　　　　　　　　　　　　　　　　　　　　715/200
2011/0185016 A1\* 7/2011 Kandasamy ........... G06Q 30/02
　　　　　　　　　　　　　　　　　　　　709/203

(Continued)

OTHER PUBLICATIONS

Rosen et al., "Push or Request: An Investigation of HTTP/2 Server Push for Improving Mobile Performance," International World Wide Web Conference Committee (IW3C2), WWW 2017, Apr. 3-7, 2017, Perth, Australia. ACM 978-1-4503-4913-0/17/04. (Year: 2017).\*

*Primary Examiner* — Christopher B Tokarczyk
(74) *Attorney, Agent, or Firm* — NICHOLSON DE VOS WEBSTER & ELLIOTT LLP

(57) ABSTRACT

A server receives a request for a network resource from a client network application. The server retrieves the network resource and detects an online advertisement tag in it. The server determines that it has access to an identity cookie for the requesting client. The server modifies the network resource including causing the tag from being processed directly by the client and adds a reference to a client-side script that will inject the online advertisement into the modified network resource. The server transmits a request for the online advertisement to an advertisement supply source, transmits a push-promise to the requesting client for the client-side script, and transmits the modified network resource to the requesting client. The server receives, from the advertisement supply source, a response to the request for the online advertisement. The server transmits the client-side script to the requesting client without receiving a separate request for the client-side script.

16 Claims, 4 Drawing Sheets

(56) References Cited

U.S. PATENT DOCUMENTS

| | | | |
|---|---|---|---|
| 2012/0116895 A1* | 5/2012 | Catalahana | G06Q 30/0276 705/14.72 |
| 2014/0129352 A1* | 5/2014 | Ringdahl | G06Q 30/0275 705/14.71 |
| 2015/0032804 A1* | 1/2015 | Fablet | H04L 67/26 709/203 |
| 2016/0127289 A1* | 5/2016 | Papa | G06Q 30/0255 709/206 |
| 2017/0169123 A1* | 6/2017 | Reshadi | H04L 9/3236 |

* cited by examiner

SERVING AN ONLINE ADVERTISEMENT ASYNCHRONOUSLY

CROSS-REFERENCE TO RELATED APPLICATIONS

This application claims the benefit of U.S. Provisional Application No. 62/865,763, filed Jun. 24, 2019, which is hereby incorporated by reference.

FIELD

Embodiments of the invention relate to the field of computer networks; and more specifically to serving an online advertisement asynchronously.

BACKGROUND

Network resources, such as web pages, commonly include online advertisements that are served by advertisement servers that are different than the parent web page (sometimes referred to as the publisher web page). Serving online advertisements, although typically appearing relatively seamless to the users, is an involved process.

For example, the client network application, such as an Internet browser, receives a web page that includes an Ad tag. The Ad tag typically includes a URL of a first Ad server. The client network application executes the Ad tag including calling the URL, which causes the client network application to connect to that first Ad server (including establishing a TCP connection with the first Ad server) and make a request according to the URL. This request may also include a cookie that identifies the client network application that the first Ad server may use when determining what online advertisement to show to the user. The first Ad server receives the request and decides which online advertisement to display and/or which marketer will select the online advertisement to display. The first Ad server then typically returns a redirect (e.g., an HTTP 302 redirect) to the client network application to cause the client network application to redirect to a second Ad server. This redirect causes the client network application to connect to the second Ad server (including establishing a TCP connection with the second Ad server) and make a request. This second Ad server could return another redirect to a server (e.g., part of a content delivery network (CDN)) that has the actual ad creative. This causes the client network application to make the call to the server for the actual creative. Thus, there can be multiple connections and directs to retrieve a single online advertisement. If any of these connections lag, the user experience is degraded.

BRIEF DESCRIPTION OF THE DRAWINGS

The invention may best be understood by referring to the following description and accompanying drawings that are used to illustrate embodiments of the invention. In the drawings.

DETAILED DESCRIPTION

Serving an online advertisement asynchronously is described. In an embodiment, a server receives a request from a client network application for a web page. The server retrieves the requested web page. The server may retrieve the requested web page locally (if available, such as if in cache), or by requesting the web page from its origin server. The server determines that it has access to an identity cookie for the client network application based on a cookie included in the request. The server detects an Ad tag for an online advertisement in the web page. The server modifies the web page so that the detected Ad tag is not processed by the client network application (e.g., the detected Ad tag may be removed or obfuscated). The server sends a request for the online advertisement to the advertisement supply source (e.g., an ad server). The server modifies the web page to include a reference to a client-side script that, when executed by the client network application, injects the online advertisement into the page. The client-side script may retrieve the online advertisement, or in some cases, the client-side script includes the online advertisement. The server transmits a push promise message for the client-side script to the client network application and transmits the modified page to the client network application. The server receives the ad response from the ad supply source. The server pushes the client-side script to the client network application. The client-side script executes and injects the advertisement into the page. The advertisement may be retrieved from the server or an ad content server, or the advertisement may be included in the client-side script itself.

Figure 1:
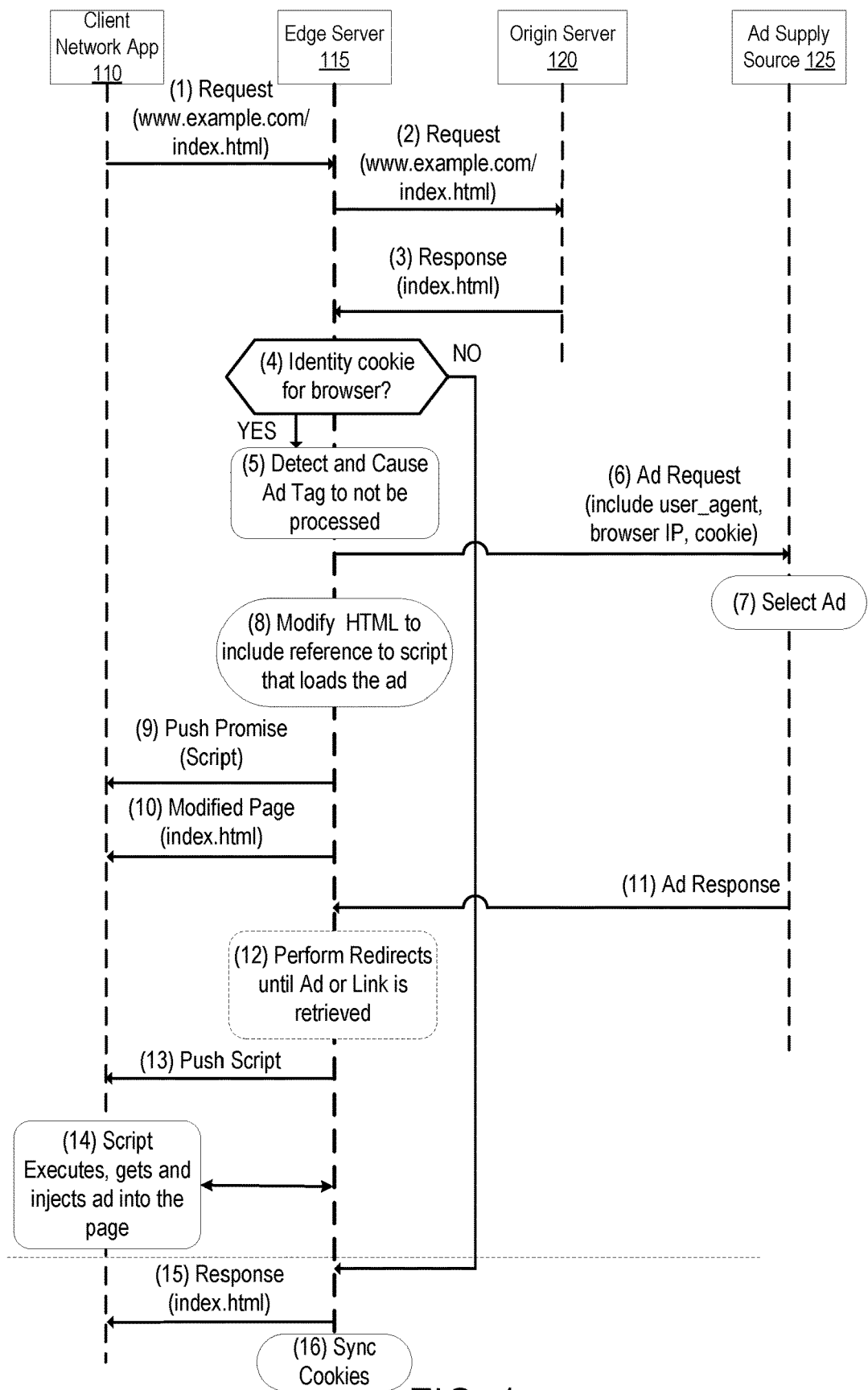
FIG. 1 is a sequence diagram that illustrates exemplary operations for asynchronously serving an online advertisement, according to an embodiment.

FIG. 1 is a sequence diagram that illustrates exemplary operations for asynchronously serving an online advertisement, according to an embodiment. FIG. 1 includes the client network application 110, the edge server 115, the origin server 120, and the ad supply source 125.

The client network application 110 executes on a client device that is a computing device (e.g., laptop, workstation, smartphone, mobile phone, tablet, gaming system, set top box, wearable device, Internet of Things (IoT) device, etc.) that is capable of transmitting and/or receiving network traffic. The client network application 110 can be a web browser, a native application, or other application that can access network resources (e.g., web pages, images, word processing documents, PDF files, movie files, music files, or other computer files).

The edge server 115 is a physical server that may be part of a distributed cloud computing network that includes multiple edge servers that are geographically distributed. The edge servers may be in different points-of-presences (PoPs). Each PoP may include one or more physical servers (e.g., one or more edge servers, one or more control servers, one or more DNS servers (e.g., one or more authoritative name servers, one or more proxy DNS servers), and one or more other pieces of network equipment such as router(s), switch(es), and/or hub(s)). Each PoP may be part of a different data center and/or colocation site. The distributed cloud computing network may provide different services for customers (e.g., domain owners or operators) such as protecting against internet-based threats, performance services (e.g., acting as a content delivery network (CDN) and dynamically caching customer's files closer to visitors, page acceleration/optimization), TCP stack optimizations, and/or other services. As will be described in greater detail herein, the edge server 115 provides for serving online advertisements asynchronously. In an embodiment, each of the edge servers are anycasted to a same IP address. Which particular edge server receives a request is determined by the network infrastructure according to an Anycast implementation or by a geographical load balancer.

The origin server 120, which may be owned or operated directly or indirectly by the customer of the distributed cloud computing network, is a computing device on which a network resource resides and/or originates (e.g., web pages, images, word processing documents, PDF files movie files, music files, or other computer files). By way of example, DNS record(s) of hostnames point to an IP address of the edge server 115 instead of the origin server 120. In that way, requests for resources handled by the origin server 120 are received by the edge server 115. In some embodiments, the authoritative name server of the customer's domain is changed to an authoritative name server distributed cloud computing network and/or individual DNS records are changed to point to the edge server (or point to other domain(s) that point to an edge server of the distributed cloud computing network). For example, the customers may change their DNS records to point to a CNAME record that points to an edge server of the distributed cloud computing network.

The ad supply source 125 is a source of online advertisements. The ad supply source 125 may participate in the selection of online advertisement and may store the actual ad creatives. The actual ad creatives may be stored in a separate server as described herein.

The edge server 115 receives a request for a web page at operation 1. In the example illustrated in FIG. 1, the request is for the web page at "www.example.com/index.html". The request may include one or more cookies. The request may specify a User-Agent string for the client network application 110 that may specify an operating system of the client device, the type of client network application, the version of the client network application, etc. The requested web page may be handled by the origin server 120. In an embodiment, the edge server 115 receives the request instead of the origin server 120 because a DNS request for the domain "www.example.com" returns an IP address of the edge server 115 instead of an IP address of the origin server 120.

Next, at operation 2, the edge server 115 transmits a request for the web page to the origin server 120. The request in operation 2 may be substantially the same as the request of operation 1. However, it may have a source address of the edge server 115 instead of the client network application 110.

At operation 3, the edge server 115 receives a response from the origin server 120 to the request that includes the requested web page. The edge server 115 may cache the response and/or the requested web page.

At operation 4, the edge server 115 determines whether it has access to an identity cookie for the client network application 110 that identifies the client network application 110 for the domain of the ad supply source 125. In an embodiment, the ad supply source 125 is the ad supply source as identified in an Ad tag as detected in operation 5. In another embodiment, the ad supply source 125 is a partner server with the edge server 115 and/or origin server 120 that may or may not be identified in the Ad tag detected in operation 5. The identity cookie is a cookie that is used for identifying the client network application. Different domain owners may identify the same client network application differently (e.g., with different identifiers). For instance, if the client network application visits a website that contains an online advertisement or a third-party tracking tag, the client network application transmits a request to the ad supply source (e.g., an ad exchange). The ad supply source typically creates a unique identifier if one doesn't already exist and stores the ID in the cookie. A cookie synchronization process is used to map the unique identifiers generated by different domain owners. The edge server 115 may access a cookie-matching table to determine if there is an identifier for the client network application 110 for the domain "example.com" that is mapped to an identifier for the client network application 110 assigned for the domain of the ad supply source 125. The cookie-matching table may be stored locally to the edge server 115 or be stored remotely from the edge server 115. If stored remotely, the edge server 115 transmits a request to the remote server that contains the mapping, the request identifying the unique identifier assigned to the client network application 110 for the domain "example.com", and the response from the edge server 115 includes the unique identifier assigned for the client network application 110 by the domain of the ad supply source 125 if one exists (if a mapping does not exist, the response indicates so). If there is an identity cookie for the client network application 110 that identifies the client network application 110 for the domain of the ad supply source 125, then operations continue at operation 5. If there is not an identity cookie for the client network application 110 that identifies the client network application 110 for the domain of the ad supply source 125, then operations continue at operation 15.

At operation 5, the edge server 115 detects an Ad tag in the web page and modifies the web page so that the detected Ad tag is not processed by the client network application 110. An Ad tag typically includes a URL for either the ad content itself or more typically a client-side script that may handle placement of the ad on the page and retrieval of the ad. The edge server 115 scans through the code of the web page (e.g., the HTML of the web page) to detect an Ad tag. For example, the edge server 115 may store a list of domains of known Ad tags and analyze the web page for those domains. After detecting an Ad tag, the edge server 115 may remove the Ad tag or obfuscate the Ad tag so that the detected Ad tag is not processed directly by the client network application 110. To obfuscate the Ad tag, the edge server 115 may change the name of the "src" attribute in the tag to another value that is not recognizable by the client network application 110. There may be several Ad tags in the web page that are modified like as described in operation 5.

At operation 6, the edge server 115 transmits an Ad request to the ad supply source 125. In an embodiment, the edge server 115 generates the Ad request, where the generated Ad request may be different than what would have been transmitted from the original Ad tag. For instance, the edge server 115 may change the ad supply source from the original Ad tag to the ad supply source 125. The Ad request transmitted to the ad supply source 125 may specify one or more of the following: the User-Agent string included in the original request of operation 1; the source IP address included in the original request of operation 1; a cookie with a value that identifies the client network application 110; and geolocation information based on the source IP address included in the original request of operation 1.

At operation 7, the ad supply source 125 selects an online advertisement in response to the Ad request. The ad supply source 125 may perform the selection in a number of different ways. For example, the ad supply source 125 may take part in an online ad auction when selecting the online advertisement. The ad supply source 125 could forward the Ad request to another server for ultimate selection of the advertisement.

At operation 8, the edge server 115 modifies the HTML of the web resource to include a reference to a client-side script that, when executed by the client network application 110, injects the online advertisement into the web resource. The client-side script may also retrieve the online advertisement, or in some cases, the client-side script may include the online advertisement. For instance, the online advertisement may be included inline in the client-side script.

Next, at operation 9, the edge server 115 transmits a push promise message for the client-side script to the client network application 110. The push promise message notifies the client network application 110 that the edge server 115 intends to initiate the sending of the client-side script. At operation 10, the edge server 115 transmits the modified page to the client network application 110.

At operation 11, the edge server 115 receives an ad response from the ad supply source 125. The ad response may include the ad creative, a link to the ad creative, or a redirect (e.g., an HTTP 302 redirect) to a different Ad server. In turn, that different Ad server may return a redirect (e.g., an HTTP 302 redirect) to a different Ad server or a content server, and so on. Thus, there may be multiple redirects that are performed until the actual ad creative or a link to the ad creative is determined. If so, the edge server 115 performs the one or more redirects until the ad creative or the link to the ad creative is determined at operation 12. In an embodiment, the edge server 115 retrieves the actual ad creative if the ad tag is not a wrapper that performs client validation before serving the actual ad creative, in which case, the edge server 115 retrieves the ad tag that is a wrapper that performs client validation. Although operations 11 and 12 are illustrated in FIG. 1 after operation 10, the operations 11 and 12 may be performed prior to any of the operations 8-10 and/or substantially at the same time as any of the operations 8-10.

At operation 13, the edge server 115 pushes the script to the client network application 110. This script may perform differently depending on the ad that is retrieved by the edge server 115. For instance, if the actual ad creative is retrieved by the edge server 115, the script may include the ad creative completely and, when executed by the client network application 110 at operation 14, may inject that ad creative directly into the page. As another example, if the edge server 115 retrieves the tag for the ad creative, the script may be configured to, when executed by the client network application 110 at operation 14, retrieve the actual ad creative by calling the tag.

At operation 14, the client network application 110 executes the script that was pushed by the edge server 115. As described with respect to operation 13, the script may inject the ad directly in the page. The script may retrieve the ad by calling the ad tag or URL.

At operation 15 (the edge server 115 determined that it did not have access to an identify cookie for the client network application 110 that identifies the client network application 110 for the domain of the ad supply source 125, the edge server 115 transmits a response to the request that includes the requested resource (e.g., the web page at "www.ex-ample.com/index.html").

Next, at operation 16, the edge server 115 performs a cookie synchronization process. In an embodiment, the cookie synchronization process includes the edge server 115 inserting an image tag pointing to a partner party server with identify on the domain included in the URL. The partner party server recognizes its cookies and the original identity in the request and returns a redirect to a URL on the original domain (received at the edge server 115) with their identity in the URL so that the original domain can record a mapping. The edge server 115 records the mapping.

Thus, instead of the client network application 110 having to issue one or more new requests for the online advertisement, the edge server 115 retrieves the ad information (the ad or ad tag) and pushes a script to the client network application 110 that, when executed by the client network application 110, handles putting the ad in the page. This reduces the time to display the advertisement on the client network application and reduces the number of requests that would otherwise have been necessary for the online advertisement thereby saving bandwidth and other resources.

Figure 2:
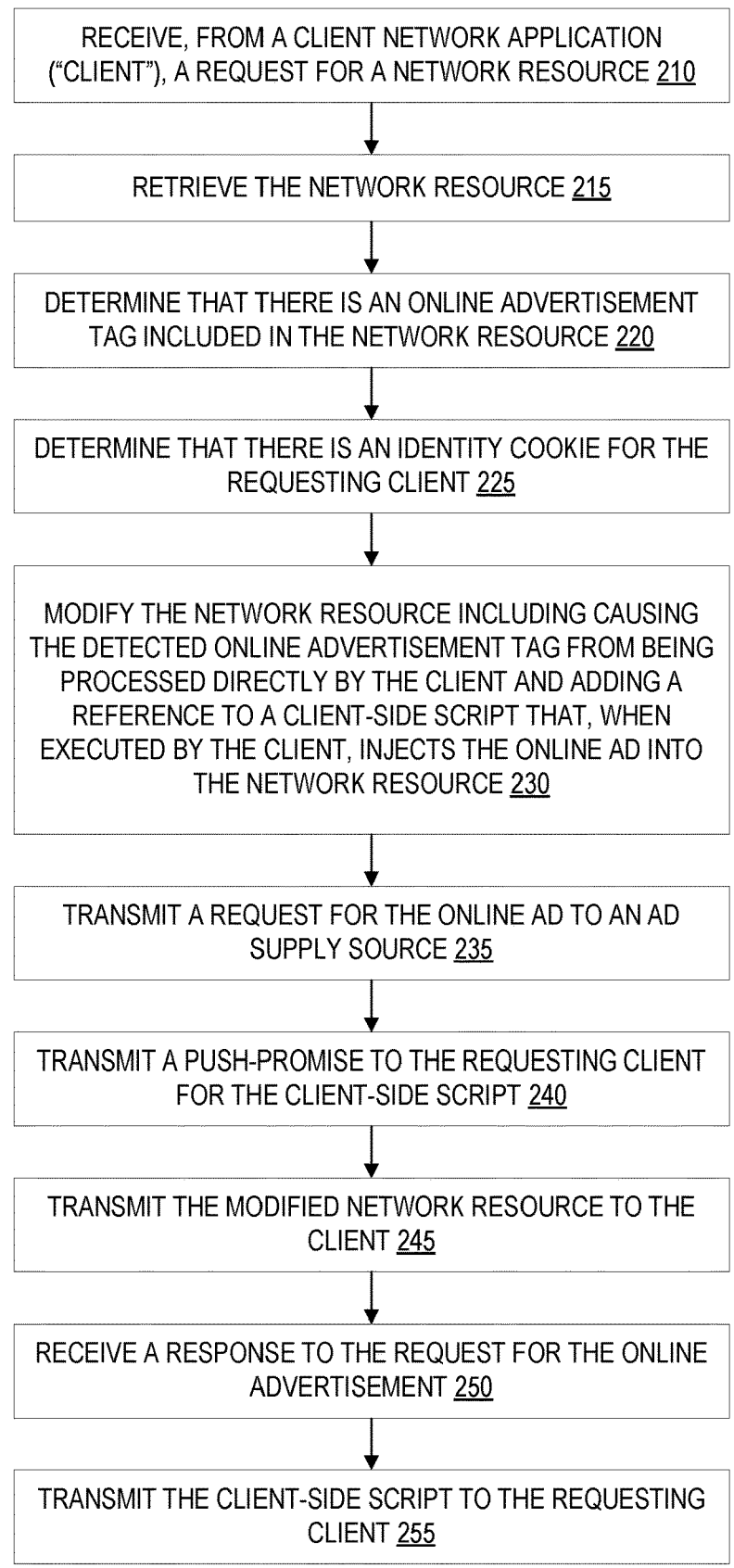
FIG. 2 is a flow diagram that illustrates exemplary operations for asynchronously serving an online advertisement, according to an embodiment.

FIG. 2 is a flow diagram that illustrates exemplary operations for asynchronously serving an online advertisement, according to an embodiment. The operations of FIG. 2 will be described with reference to the exemplary embodiment of FIG. 1. However, the operations of FIG. 2 can be performed by a different embodiment than described with FIG. 1, and the embodiment described in FIG. 1 can perform additional, less, and/or different operations than those described in FIG. 2.

At operation 210, the edge server 115 receives, from the client network application 110, a request for a network resource. In an embodiment, the request is for a web page. The request may include one or more cookies. The request may specify a User-Agent string for the client network application 110 that may specify an operating system of the client device, the type of client network application, the version of the client network application, etc. The requested web page may be handled by the origin server 120. In an embodiment, the edge server 115 receives the request instead of the origin server 120 because a DNS request for the for the hostname of the network resource returns an IP address of the edge server 115 instead of an IP address of the origin server 120.

Next, at operation 215, the edge server 115 retrieves the requested network resource. The edge server 115 may retrieve the requested network resource locally if it is available in a cache available to the edge server 115. If not available in a cache, the edge server 115 retrieves the requested network resource from the origin server 120. For example, the edge server 115 transmits a request for the network resource to the origin server 120 and receives a response with the requested network resource from the origin server 120. The edge server 115 may cache the response and requested network resource from the origin server 120.

Next, at operation 220, the edge server 115 determines that there is an online advertisement tag included in the network resource. For instance, the edge server 115 analyzes the content of the network resource to determine if there is an online advertisement tag. The edge server 115 may store a list of domains of known online advertisement tags and checks the network resource for those domains. There may be multiple online advertisement tags included in the network resource.

Next, at operation 225, the edge server 115 determines that it has access to an identity cookie for the requesting client network application 110 that identifies the client network application 110 for the domain of the ad supply source 125. The ad supply source 125 may be the ad supply source as identified in the online advertisement tag. Alternatively, the ad supply source 125 is a partner server with the edge server 115 and/or origin server 120 that may or may not be identified in the online advertisement tag. The identity cookie may be included in the request from the client network application 110. If not included in the request, the edge server 115 may determine if it has access to an identity cookie for the client network application 110 by accessing a mapping that includes identity cookies.

Next, at operation 230, the edge server 115 modifies the network resource including causing the detected online advertisement tag from being processed directly by the client network application 110 and adding a reference to a client-side script that, when executed by the client network application 110, injects the online advertisement into the web resource. The client-side script may also retrieve the online advertisement, or in some cases, the client-side script may include the online advertisement. For instance, the online advertisement may be included inline in the client-side script. In an embodiment, to cause the online advertisement tag from being processed directly by the client network application 110, the edge server 115 may remove the online advertisement tag or obfuscate it so that the detected online advertisement tag is not processed directly by the client network application 110. To obfuscate the tag, the edge server 115 may change the name of the "src" attribute in the tag to another value that is not recognizable by the client network application 110, for example.

Next, at operation 235, the edge server 115 transmits a request for the online advertisement to the ad supply source 125. In an embodiment, the edge server 115 generates this request, where the generated request may be different than what would have been transmitted from the original online advertisement tag. For instance, the edge server 115 may change the ad supply source from the original online advertisement tag to the ad supply source 125. The request transmitted to the ad supply source 125 may specify one or more of the following: the User-Agent string included in the original request; the source IP address included in the original request; a cookie with a value that identifies the client network application 110; and geolocation information based on the source IP address included in the original request. The ad supply source 125 receives and processes the ad request. The ad supply source 125 may participate in the selection of the online advertisement such as taking part in an online ad auction. The ad supply source 125 could forward the request to another server for ultimate selection of the advertisement.

At operation 240, the edge server 115 transmits a push promise message for the client-side script to the client network application 110. The push promise message notifies the client network application 110 that the edge server 115 intends to initiate the sending of the client-side script. Next, at operation 245, the edge server 115 transmits the modified network resource to the client network application 110.

The edge server 115 receives a response to the request for the online advertisement at operation 250. This response may include the ad creative, a link to the ad creative, or a redirect (e.g., an HTTP 302 redirect) to a different Ad server. In turn, that different Ad server may return a redirect (e.g., an HTTP 302 redirect) to a different Ad server or a content server, and so on. Thus, there may be multiple redirects that are performed until the actual ad creative or a link to the ad creative is determined. If so, the edge server 115 performs the one or more redirects until the ad creative or the link to the ad creative is determined. In an embodiment, the edge server 115 retrieves the actual ad creative if the ad tag is not a wrapper that performs client validation before serving the actual ad creative, in which case, the edge server 115 retrieves the ad tag that is a wrapper that performs client validation.

Next, at operation 255, the edge server 115 transmits the client-side script to the client network application 110. This script may perform differently depending on the ad that is retrieved by the edge server 115. For instance, if the actual ad creative is retrieved by the edge server 115, the script may include the ad creative completely and, when executed by the client network application 110, may inject that ad creative directly into the page. As another example, if the edge server 115 retrieves the tag for the ad creative, the script may be configured to, when executed by the client network application 110, retrieve the actual ad creative by calling the tag.

The client network application 110 receives and executes the client-side script. As described above, the client-side script will retrieve and/or place the online advertisement into the network resource.

Thus, instead of the client network application 110 having to issue one or more new requests for the online advertisement, the edge server 115 retrieves the ad information (the ad or ad tag) and pushes a script to the client network application 110 that, when executed by the client network application 110, handles putting the ad in the page. This reduces the time to display the advertisement on the client network application and reduces the number of requests that would otherwise have been necessary for the online advertisement thereby saving bandwidth and other resources.

Figure 3:
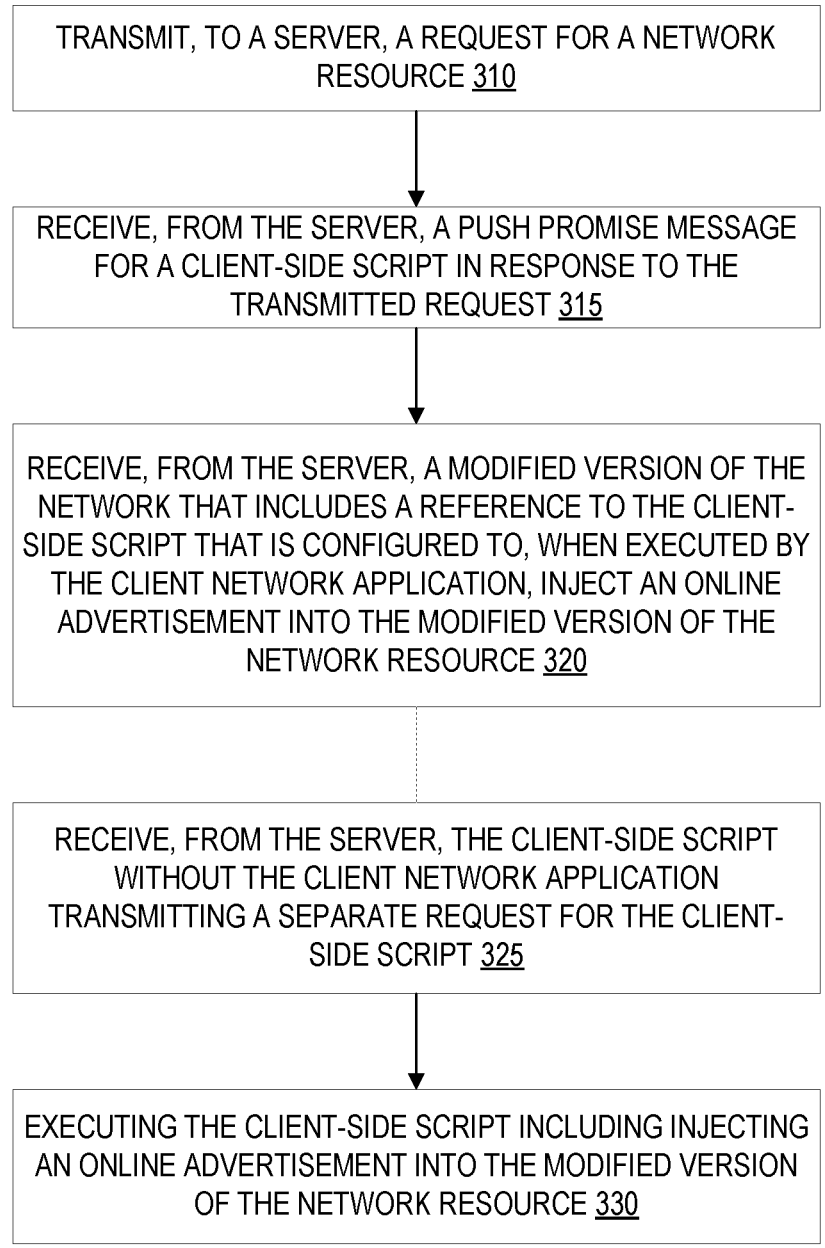
FIG. 3 is a flow diagram that illustrates exemplary operations for a client network application executing on a client device retrieving an online advertisement, according to an embodiment.

FIG. 3 is a flow diagram that illustrates exemplary operations for a client network application executing on a client device retrieving an online advertisement, according to an embodiment. The operations of FIG. 3 will be described with reference to the exemplary embodiment of FIG. 1. However, the operations of FIG. 3 can be performed by a different embodiment than described with FIG. 1, and the embodiment described in FIG. 1 can perform additional, less, and/or different operations than those described in FIG. 3.

At operation 310, the client network application 110 transmits a request for a network resource. This request is received by the edge server 115. The request includes a user-agent string for the client network application 110 that may specify, among other items, the operating system of the client device, the type of client network application, the version of client network application, etc. The request includes one or more cookies, including an identity cookie for the client network application 110.

Next, at operation 315, the client network application 110 receives, from the edge server 115, a push promise message for a client-side script in response to the transmitted request. The push promise message notifies the client network application 110 that the edge server 115 intends to initiate the sending of the client-side script. Next, at operation 320, the client network application 110 receives from the edge server 115 a modified version of the requested resource that includes a reference to the client-side script. The client-side script is configured to, when executed by the client network application 110, inject an online advertisement into the modified version of the network resource. The network resource may be modified by the edge server 115 in at least two ways. For example, the network resource may have modified the network resource so that an original ad tag is not processed by the client network application 110 (e.g., either by removing the original ad tag or obfuscating the original ad tag so that it is not understandable by the client network application 110 directly). The edge server 115 handles requesting the online advertisement from the ad supply source, including performing the one or more redirects until the actual ad creative or the link to the ad creative is determined.

Next, at operation 325, the client network application 110 receives, from the server, the client-side script without the client network application 110 transmitting a separate request for the client-side script. Thus, the client-side script is pushed to the client network application 110. Next, at operation 330, the client network application 110 executes the client-side script including injecting an online advertisement into the modified version of the network resource. Executing the client-side script may include the client-side script injecting the online advertisement directly in the page. The client-side script may retrieve the online advertisement by calling the ad tag included in the client-side script.

Thus, instead of the client network application 110 having to issue one or more new requests for the online advertisement, the edge server 115 retrieves the ad information (the ad or ad tag) and pushes a script to the client network application 110 that, when executed by the client network application 110, handles putting the ad in the page. This reduces the time to display the advertisement on the client network application and reduces the number of requests that would otherwise have been necessary for the online advertisement thereby saving bandwidth and other resources.

Figure 4:
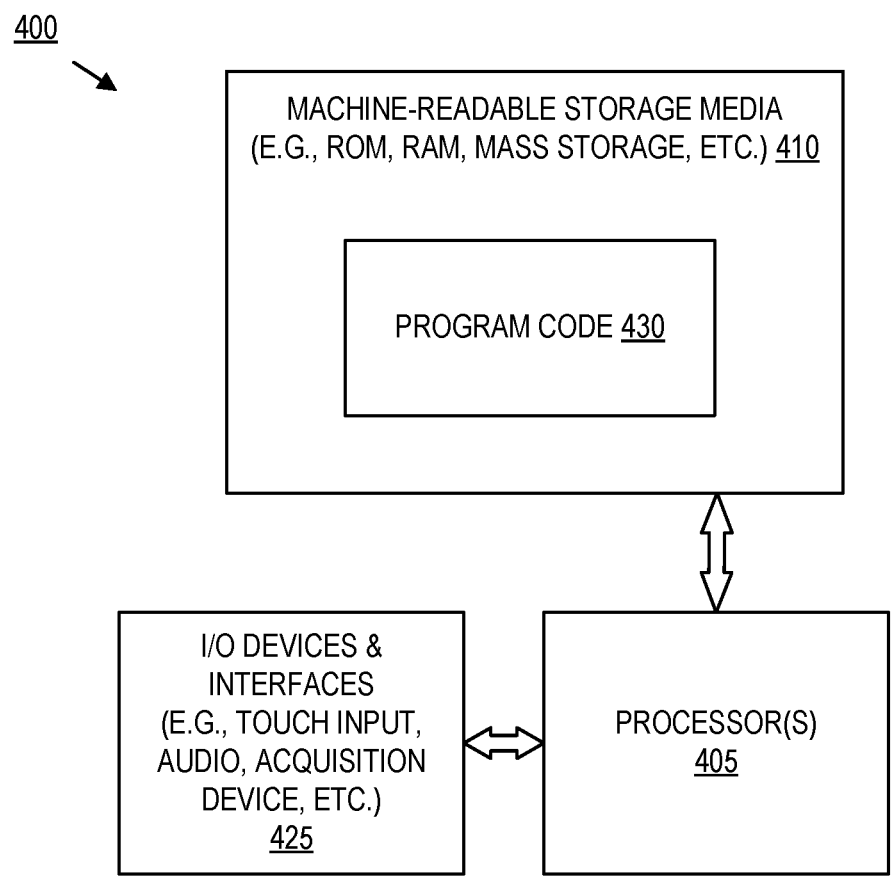
FIG. 4 illustrates a block diagram for an exemplary data processing system that may be used in some embodiments.

FIG. 4 illustrates a block diagram for an exemplary data processing system 400 that may be used in some embodiments. Data processing system 400 includes one or more processors 405 and connected system components (e.g., multiple connected chips). One or more such data processing systems 400 may be utilized to implement the embodiments and operations described with respect to the edge server, or other electronic device.

The data processing system 400 is an electronic device which stores and transmits (internally and/or with other electronic devices over a network) code (which is composed of software instructions and which is sometimes referred to as computer program code or a computer program) and/or data using machine-readable media (also called computer-readable media), such as machine-readable storage media 410 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processor(s) 405. For example, the depicted machine-readable storage media 410 may store program code 430 that, when executed by the processor(s) 405, causes the data processing system 400 to execute the operations described herein.

The data processing system 400 also includes one or more input or output ("I/O") devices and interfaces 425, which are provided to allow a user to provide input to, receive output from, and otherwise transfer data to and from the system. These I/O devices 425 may include a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. The I/O devices and interfaces 425 may include wireless transceivers, such as an IEEE 802.11 transceiver, an infrared transceiver, a Bluetooth transceiver, a wireless cellular telephony transceiver (e.g., 2G, 3G, 4G, 5G), an NFC transceiver, or another wireless protocol to connect the data processing system 400 with another device, external component, or a network and receive stored instructions, data, tokens, etc. For instance, a wired or wireless transceiver may transmit and receive messages to and from the edge server as described herein.

Additional components, not shown, may also be part of the system 400, and, in certain embodiments, fewer components than that shown in FIG. 4 may also be used in a data processing system 400. One or more buses may be used to interconnect the various components shown in FIG. 4.

Thus, an electronic device (e.g., an edge server) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The techniques shown in the figures can be implemented using code and data stored and executed on one or more computing devices (e.g., client device, edge server, origin server, etc.). Such computing devices store and communicate (internally and/or with other computing devices over a network) code and data using machine-readable media, such as non-transitory machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth. However, it is understood that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a server, comprising:
    receiving, from a client network application, a request for a network resource;
    retrieving the network resource;
    detecting an online advertisement tag in the network resource;
    determining that the server has access to an identity cookie for the requesting client network application;
    modifying, by the server, the network resource prior to returning a modified network resource to the client network application, including:
        obfuscating the online advertisement tag to prevent the online advertisement tag from being processed directly by the client network application, and
        adding a reference to a client-side script that is configured to, when executed by the client network application, inject an online advertisement into the modified network resource;
    transmitting, by the server, a request for the online advertisement to an advertisement supply source;
    transmitting a push-promise to the requesting client network application for the client-side script;
    transmitting, by the server, the modified network resource to the requesting client network application;
    receiving, from the advertisement supply source, a response to the request for the online advertisement; and
    transmitting the client-side script to the requesting client network application, including the online advertisement received from the advertisement supply source in the response to the request, without receiving a separate request for the client-side script from the requesting client network application.

2. The method of claim 1, further comprising:
    receiving a second request for a second network resource originating from a second client network application;
    retrieving the second network resource;
    determining that the server does not have access to an identity cookie for the requesting second client network application; and
    performing a cookie synchronization to provide the identity cookie for the requesting second client network application.

3. The method of claim 1, further comprising:
    wherein the received response to the request for the online advertisement includes a redirection to another server; and
    transmitting a request to another server for the online advertisement in accordance with the redirection without transmitting the redirection to the requesting client network application.

4. The method of claim 1, wherein the client-side script includes the online advertisement inline.

5. The method of claim 1, further comprising:
    wherein the request for the network resource includes a user-agent string of the client network application; and
    wherein transmitting the request for the online advertisement to the advertisement supply source includes:
        information of the user-agent string of the client network application, and
        the identity cookie for the requesting client network application.

6. A method in a client device executing a client network application, comprising:
    transmitting a request for a network resource, wherein the request includes one or more cookies;
    receiving, from a server in response to the transmitted request, a push promise message for a client-side script;
    receiving, from the server, a modified version of the network resource, wherein the modified version of the network resource includes an obfuscated online advertisement tag that prevents the online advertisement tag from being processed directly by the client network application and a reference to the client-side script that is inserted by the server and configured to, when executed by the client network application, inject an online advertisement into the modified version of the network resource;
    receiving, from the server, the client-side script including an online advertisement received from an advertisement supply source without the client network application transmitting a separate request for the client-side script, wherein the online advertisement is received by the server responsive to a request from the server; and
    executing the client-side script including injecting the online advertisement into the modified version of the network resource.

7. The method of claim 6, wherein at least one of the one or more cookies is an identity cookie of the requesting client network application for an ad supply source.

8. The method of claim 6, wherein the client-side script includes the online advertisement inline.

9. A non-transitory machine-readable storage medium that provides instructions that, when executed by a processor of a server, is capable of causing the processor to perform operations comprising:
    receiving, from a client network application, a request for a network resource;
    retrieving the network resource;
    detecting an online advertisement tag in the network resource;
    determining that the server has access to an identity cookie for the requesting client network application;
    modifying, by the server, the network resource prior to returning a modified network resource to the client network application, including:
        obfuscating the online advertisement tag to prevent the online advertisement tag from being processed directly by the client network application, and adding a reference to a client-side script that is configured to, when executed by the client network application, inject an online advertisement into the modified network resource;

transmitting, by the server, a request for the online advertisement to an advertisement supply source;

transmitting a push-promise to the requesting client network application for the client-side script;

transmitting, by the server, the modified network resource to the requesting client network application;

receiving, from the advertisement supply source, a response to the request for the online advertisement; and transmitting the client-side script to the requesting client network application, including the online advertisement received from the advertisement supply source in the response to the request, without receiving a separate request for the client-side script from the requesting client network application.

10. The non-transitory machine-readable storage medium of claim 9, wherein the operations further comprise:

receiving a second request for a second network resource originating from a second client network application;

retrieving the second network resource;

determining that the server does not have access to an identity cookie for the requesting second client network application; and performing a cookie synchronization to provide the identity cookie for the requesting second client network application.

11. The non-transitory machine-readable storage medium of claim 9, wherein the operations further comprise:

wherein the received response to the request for the online advertisement includes a redirection to another server; and transmitting a request to another server for the online advertisement in accordance with the redirection without transmitting the redirection to the requesting client network application.

12. The non-transitory machine-readable storage medium of claim 9, wherein the client-side script includes the online advertisement inline.

13. The non-transitory machine-readable storage medium of claim 9, wherein the operations further comprise:

wherein the request for the network resource includes a user-agent string of the client network application; and wherein transmitting the request for the online advertisement to the advertisement supply source includes:

information of the user-agent string of the client network application, and the identity cookie for the requesting client network application.

14. A non-transitory machine-readable storage medium that provides instructions that, when executed by a processor of a client device executing a client network application, is capable of causing the processor to perform operations comprising:

transmitting a request for a network resource, wherein the request includes one or more cookies;

receiving, from a server in response to the transmitted request, a push promise message for a client-side script;

receiving, from the server, a modified version of the network resource, wherein the modified version of the network resource includes an obfuscated online advertisement tag that prevents the online advertisement tag from being processed directly by the client network application and a reference to the client-side script that is inserted by the server and configured to, when executed by the client network application, inject an online advertisement into the modified version of the network resource;

receiving, from the server, the client-side script including an online advertisement received from an advertisement supply source without the client network application transmitting a separate request for the client-side script, wherein the online advertisement is received by the server responsive to a request from the server; and executing the client-side script including injecting the online advertisement into the modified version of the network resource.

15. The non-transitory machine-readable storage medium of claim 14, wherein at least one of the one or more cookies is an identity cookie of the requesting client network application for an ad supply source.

16. The non-transitory machine-readable storage medium of claim 14, wherein the client-side script includes the online advertisement inline.

* * * * *